Sept. 7, 1965                G. S. RUXTON                3,204,772
                            SAND SEPARATOR
                         Filed June 21, 1962
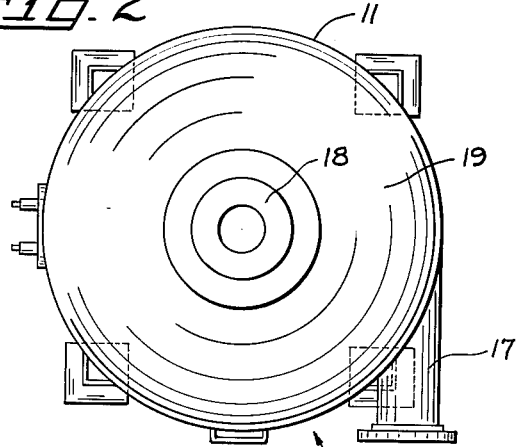
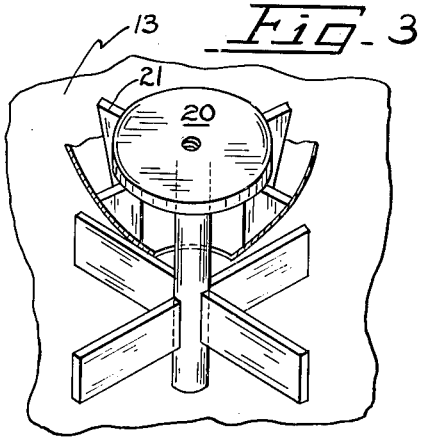
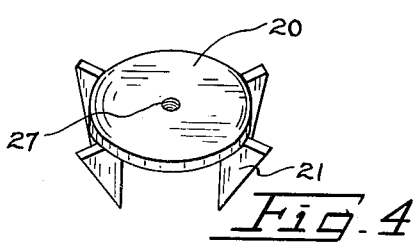
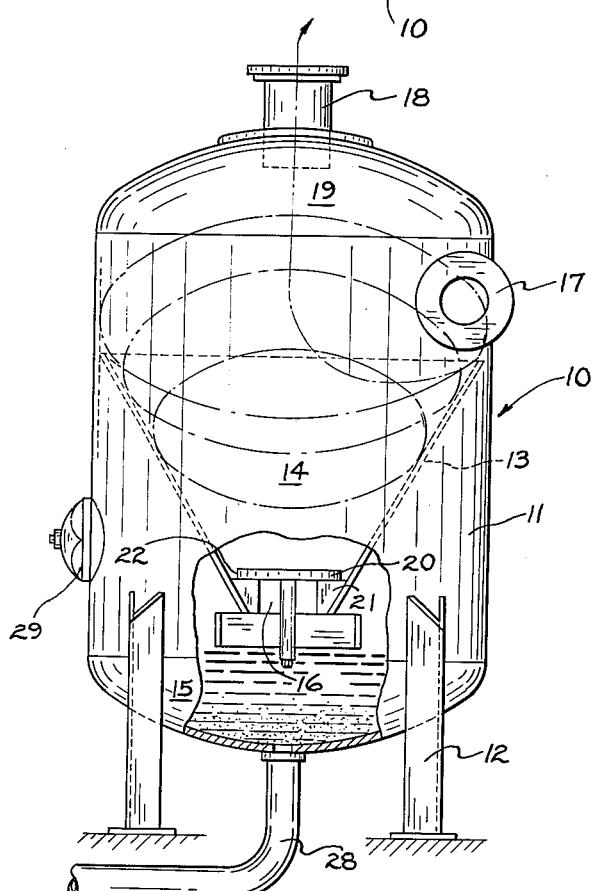
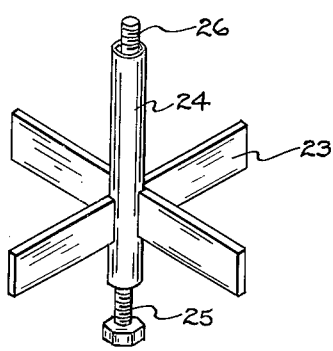
INVENTOR.
GEORGE S. RUXTON
BY
ATTORNEY

United States Patent Office 3,204,772
Patented Sept. 7, 1965

3,204,772
SAND SEPARATOR
George S. Ruxton, San Lorenzo, Calif., assignor to Pacific Pumping Company, Oakland, Calif., a corporation of California
Filed June 21, 1962, Ser. No. 204,124
4 Claims. (Cl. 210—512)

This invention relates to separators for removing entrained solids from liquids, and more particularly it relates to improvements in centrifugal type separators for extracting sand from water.

Centrifugal separation devices for removing sand from water pumped from wells are well known in the art. Generally, their mode of operation is to direct the sand laden water into a cylindrical vessel so that the water assumes a swirling flow and causes the heavier sand particles to move outwardly against the wall of the vessel. The particles eventually gravitate downwardly and settle to the bottom of the vessel. Many such separators heretofore devised were successful in producing a fairly high degree of sand separation at relatively low and constant flow rates. However, they suffered a marked decrease in performance and separating effectiveness at relatively higher flow rates and also during fluctuations in the flow rate that cause variable turbulence in the separator. What happened in these prior art separators was that the variable operating conditions caused the initially separated sand particles to be agitated in the settling compartment of the separator and thus re-entrained into the water flowing out of the vessel.

Accordingly, it is one object of the present invention to solve the aforementioned problem by providing an improved separator device that prevents the agitation of and thus the re-entraining of any particles back into the fluid leaving the separator once they have been separated from the fluid. In my separator this important function is accomplished by means of a relatively simple but unique arrangement of elements which enables the sand, initially separated by the turbulent swirling action in the separator compartment, to flow easily by gravity into a quiet settling or accumulator compartment, and which maintains the fluid in the accumulator compartment in its quiescent state despite its close proximity to the separator compartment.

Because of the novel arrangement of elements in my separator the coupling action of the circulating fluid in the separating chamber with the fluid in the accumulator compartment has been completely eliminated or reduced to a negligible amount, and thus no circulation can occur in the settling zone. Moreover, the accumulator compartment is completely protected from the influence of any vortex of swirling water in the centrifugal chamber that could enter the quiescent zone and stir up the accumulated sand.

Another object of the invention is to provide a centrifugal separator that will afford a high percentage of sand separation at both high and low rates and yet one that will not be affected by any abrupt changes in flow rate.

A further object is to provide a centrifugal sand separation device that will afford maximum separation effectiveness with a minimum of pressure loss of the water going through the separator.

Still another object of the invention is to provide a sand separator that is unusually well adapted for ease and economy of manufacture.

Another object of the invention is to provide a sand separator that maintains an accumulator compartment free from the influence of any current or turbulence in an adjoining separator compartment and which is easy to clean and service.

Other objects, advantages and features of the invention will become apparent from the following detailed description of a typical embodiment thereof as illustrated by the accompanying drawings, in which:

FIG. 1 is a view in elevation and partly in section of an apparatus embodying the principles of the present invention;

FIG. 2 is a plan view of the apparatus of FIG. 1;

FIG. 3 is an enlarged fragmentary view in perspective showing the internal vortex control portion of the apparatus of FIGS. 1 and 2 according to the invention;

FIG. 4 is a view in perspective of a baffle plate for the vortex control portion of the apparatus shown in FIG. 3;

FIG. 5 is a view in perspective of the stabilizing vanes of the vortex control detached from the baffle plate.

Referring to the drawings, the sand separator 10 shown in FIGS. 1 and 2 includes a generally cylindrical water storage tank 11, preferably supported above the ground by legs 12 in lieu of providing an underground sand-disposal system, although that is sometimes feasible. Within tank 11 is fixed a conical shaped partition 13 that forms an upper separator compartment 14 and a lower accumulator compartment 15. The conical partition 13 tapers downwardly to a circular truncated end opening 16 through which the sand that has been separated from the incoming water in the separator compartment passes into the accumulator compartment 15.

Water enters the separator 10 from an inlet pipe 17 connected to the tank just about the conical partition 13. The pipe 17 is mounted so as to discharge the water into the separator compartment 15 in a substantially tangential direction, thereby causing the water to be whirled rapidly around the inside of the separator compartment formed by the tank 11 and the partition 13. This whirling action causes the heavy sand particles to be moved by centrifugal force out against the conical partition 13, where they then fall downward and through the opening 16 into the accumulator compartment 15. Nearly all the sand or sediment originally suspended in the incoming water, along with a very small amount of the water, is therefore ejected directly into the accumulator compartment 15 where it settles toward the bottom of the tank 11. As the sand is eliminated from the water by centrifugal force, the water in the separator compartment 14 moves up toward an outlet 18 which is located in the center of the top wall 19 of the tank 11.

In the accumulator compartment 15 it is necessary that the water be quiescent so that the accumulated sand deposited therein will settle and not become agitated and redrawn into the whirling water in the separating compartment 14. My invention solves the problem of isolating the accumulator compartment from the separator compartment in such a manner that the settled out sand and the water in it will not be stirred up by a coupling action or by any vortex created by the whirling water in the separator compartment. As shown in FIG. 1, at the bottom of the conical partition 13 directly above the opening 16 I provide a circular disc-like baffle or control member 20 that is supported within the cone 13 by a plurality of triangular shaped brackets 21. All of the brackets 21 have an outer edge that forms an angle relative to the central perpendicular axis of the disc 20 that is preferably equal to the slope of the partition 13. The disc 20 is attached to the upper edges of the brackets 21 by some suitable means and the brackets 21 are spaced apart radially so that when installed the disc is positioned above the opening 16. The brackets 21 are preferably not attached to the wall of the conical partition 13 in order to facilitate the easy removal of the control member 20 and the cleaning of the apparatus. When installed within the partition 13 an annular space 22 is formed around the disc 20 that is sufficient to allow the sand which has been removed from the whirling water to pass freely into the accumulator compartment 15. Yet the opening 16 is covered by the disc 20 so that the central vortex of the water in the separator section cannot penetrate into and agitate the accumulator section 15.

The brackets 21 in addition to supporting the disc 20, also act as control vanes which impede somewhat the whirling action of the water in the lower end of separator compartment 14 that would tend to cause a rotary current in the accumulator compartment. However, to eliminate absolutely any rotational current or turbulence of the fluid in the accumulator compartment 15, a plurality of longer spaced apart vanes 23 are provided in combination with the disc 20 and extend radially outward into the accumulator compartment 15 below the conical partition 13. The vanes 23 are fixed as by welding to a tubular center member 24 that extends axially downward from and is removably attached to the disc 20. The center member 24 is held in place on the disc 20 by a bolt member 25 having its head at the lower end of the tube 24 and a threaded portion 26 that extends above its lower end so that it can be threaded into a central tapped opening 27 in the disc 20.

At the bottom of the tank 11 is an outlet pipe 28 which provides a means for removing the accumulated sand. In the tank wall near the bottom I may also provide an access door 29 that can be opened when desired to enable one to clean the accumulator compartment 15 and to flush out all of the collected sand when the separator is shut down.

In operation, the disc 20 which is slightly smaller in diameter than the opening 16, is inserted into the separator compartment 14 through the opening 16 and is leveled into its normal position perpendicular the central axis of the tank 11. The bolt 25 is then passed up through the tubular member 24 and is threadedly fixed to the disc 20. Water with suspended sediment or sand particles therein is now discharged tangentially through the inlet pipe 17 into the tank 11 and commences to whirl in the separator compartment 14. A typical flow pattern of a water stream as it flows through the separator is indicated by the phantom line in FIG. 1, showing how it follows a helical path, and into a vortex that eventually feeds the purified water free from sand through the outlet pipe 18. The sand removed by centrifugal force from the whirling water stream gravitates downward into the settling compartment 15.

The combined action of the vortex deflecting disc 20 located just above the opening 16 and the guide vanes 23 just below the opening 16 produces a new result that enables a high flow rate to be maintained through the separator with almost 100% separation of the sand in the water. As the water flows tangentially into the separator compartment its whirling movement forms a central vortex. The lower end of the vortex is arrested by the disc 20 and thus cannot extend downward into the accumulator compartment 15 to disturb the settled sand or sediment. Instead, it is deflected upward from the disc 20 and towards the outlet pipe 18. Any rotary coupling effect of the whirling water in the separator section which would normally be transmitted through the annular space 22 around the disc 20 is completely arrested by the guide vanes 23 that extend directly below the opening and radially into the accumulation section.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A unit for separating entrained sand from water, including in combination:

a vertical cylindrical storage tank haivng a side wall, a top wall with a central outlet for water, and a bottom wall with a central outlet for a sand slurry;

a conical shaped partition attached to the inside of said side wall and tapering concentrically downward with said tank and having a truncated end opening at its lower end, said partition forming a conical separator compartment above said opening and a quiescent storage accumulator compartment surrounding and below said conical partition;

an inlet means for discharging water containing solids such as sand, in a substantially tangential direction into the separator compartment of said unit above said opening in said conical partition;

a disc-like member including a plurality of spacers supported by and mounted within said conical partition above said opening and having a depending member extending through the opening;

and vane means connected to said depending member and extending substantially radially outwardly into said accumulator compartment below said opening of said conical shaped partition and above the bottom wall of said storage tank.

2. A unit for separating entrained sand from water, including in combination:

a vertical cylindrical storage tank having a side wall, a top wall with a central outlet for water, and a bottom wall with a central outlet for a sand slurry;

a conical shaped partition attached at its upper end to the inside of said side wall and tapering downward within said tank and having a truncated end opening at its lower end, said partition providing a separator compartment above said opening and an accumulator compartment surrounding said separator compartment and below said opening within said unit;

an inlet means for discharging water containing solids such as sand, in a substantially tangential direction into the separator compartment of said unit above said partition;

a horizontally extending disc-like plate mounted within and spaced inwardly from the wall of said conical partition above said opening, means supporting said plate in its mounted position, said plate having an axial depending member extending through said truncated end opening therein;

and transverse vane means rigidly connected to said axial depending member and extending substantially radially therefrom into said accumulator compartment below said opening and above the bottom wall of said storage tank.

3. A unit for separating entrained sand from water, including in combination:

a vertical cylindrical storage tanke having a side wall, a top wall with a central outlet for water, and a bottom wall with a central outlet for a sand slurry;

a conical partition having downwardly converging walls attached at their upper end to the inside of said side wall and tapering downward to an opening at its lower end, said partition forming a separator compartment above said opening and an accumulator compartment surrounding said separator compartment and below said opening;

an inlet means for discharging water containing solids such as sand, in a substantially tangential direction into the separator compartment of said tank above said partition;

a vortex control plate mounted horizontally within said conical partition above said opening, said plate having a depending member extending through said opening;

spacer means supporting said control plate on said conical partition walls at a distance away from said opening thereby forming space around said plate above said opening for separated sand to pass into said sand accumulator compartment;

and vane means removably connected to said depending member of said vortex control plate extending below said opening and substantially radially outwardly therefrom into said accumulator compartment and above the bottom wall of said storage tank.

4. The device as described in claim 3 wherein said spacer means comprise bracket members adjacent the underside of said plate and extend radially outwardly from the edge thereof, said plate being positioned by said bracket members above said opening thereby forming an annular passageway between its periphery and said partition.

References Cited by the Examiner

UNITED STATES PATENTS

| | | | |
|---|---|---|---|
| 1,202,356 | 10/16 | Blackmer | 210—512 |
| 1,301,544 | 4/19 | Crombie | 210—512 |
| 1,996,547 | 4/35 | Mason | 210—512 X |
| 2,010,435 | 8/35 | Matheson | 210—512 X |
| 2,179,919 | 11/39 | Carr et al. | 210—512 X |
| 2,491,801 | 12/49 | Debrey | 210—512 X |
| 2,735,547 | 2/56 | Vissac | 210—512 X |

REUBEN FRIEDMAN, *Primary Examiner.*

HERBERT L. MARTIN, *Examiner.*